United States Patent
McLaughlin et al.

(10) Patent No.: US 10,488,509 B2
(45) Date of Patent: Nov. 26, 2019

(54) ASYMMETRIC DOUBLE-SIDED TWO-WAY RANGING IN AN ULTRAWIDEBAND COMMUNICATION SYSTEM

(71) Applicants: Michael McLaughlin, Dublin (IE); Billy Verso, Maynooth (IE)

(72) Inventors: Michael McLaughlin, Dublin (IE); Billy Verso, Maynooth (IE)

(73) Assignee: Decawave, Ltd. (IE)

( * ) Notice: Subject to any disclaimer, the term of this patent is extended or adjusted under 35 U.S.C. 154(b) by 234 days.

(21) Appl. No.: 15/500,633

(22) PCT Filed: May 12, 2016

(86) PCT No.: PCT/EP2016/060785
§ 371 (c)(1),
(2) Date: Jan. 31, 2017

(87) PCT Pub. No.: WO2016/180952
PCT Pub. Date: Nov. 17, 2016

(65) Prior Publication Data
US 2018/0059235 A1    Mar. 1, 2018

Related U.S. Application Data

(60) Provisional application No. 62/160,469, filed on May 12, 2015.

(51) Int. Cl.
*G01S 13/76*     (2006.01)
*G01S 13/78*     (2006.01)
*G01S 13/20*     (2006.01)
*H01Q 5/25*      (2015.01)

(52) U.S. Cl.
CPC ............ *G01S 13/765* (2013.01); *G01S 13/20* (2013.01); *G01S 13/767* (2013.01); *G01S 13/785* (2013.01); *H01Q 5/25* (2015.01)

(58) Field of Classification Search
CPC ...... G01S 13/765; G01S 13/20; G01S 13/767; H01Q 5/25
See application file for complete search history.

(56) References Cited

U.S. PATENT DOCUMENTS

| | | | |
|---|---|---|---|
| 5,748,891 A | 5/1998 | Fleming et al. | |
| 6,400,754 B2 | 5/2002 | Fleming et al. | |
| 7,843,379 B2 | 11/2010 | Menzer | |
| 2011/0119024 A1* | 5/2011 | Nam | G01S 5/021 702/150 |

(Continued)

FOREIGN PATENT DOCUMENTS

| | | |
|---|---|---|
| WO | WO 2006/059296 A2 | 6/2006 |
| WO | WO 2006/059296 A3 | 6/2006 |
| WO | WO 2009/110669 A1 | 9/2009 |

*Primary Examiner* — Vladimir Magloire
*Assistant Examiner* — Donald H B Braswell
(74) *Attorney, Agent, or Firm* — Artie Pennington; Hunt Pennington Kumar & Dula, PLLC

(57) ABSTRACT

In an ultra-wideband ("UWB") communication system comprising a pair of UWB transceivers, an asynchronous two-way ranging method for closely estimating the time-of-flight between the transceivers after the exchange of only 3 messages between the transceivers. In an alternate asynchronous two-way ranging method, the time-of-flight between the transceivers may be closely estimated after the exchange of only 4 messages between the transceivers.

9 Claims, 3 Drawing Sheets

(56) References Cited

U.S. PATENT DOCUMENTS

2015/0331099 A1\* 11/2015 Wu .................. G01S 13/876
   342/32
2017/0059701 A1\* 3/2017 Oh .................. G01S 13/765
2017/0063477 A1\* 3/2017 Reisinger ............. H04B 17/30

\* cited by examiner

ASYMMETRIC DOUBLE-SIDED TWO-WAY RANGING IN AN ULTRAWIDEBAND COMMUNICATION SYSTEM

CROSS-REFERENCE TO RELATED APPLICATIONS

This application is related to Provisional Application Ser. No. 62/160,469, filed 12 May 2015 ("Parent Provisional").

This application claims priority to the Parent Provisional, and hereby claims benefit of the filing date thereof pursuant to 37 CFR §1.78(a)(4).

The subject matter of the Parent Provisional, in its entirety, is expressly incorporated herein by reference.

BACKGROUND OF THE INVENTION

1. Field of the Invention

The present invention relates generally to wireless communication systems, and, in particular, to a wireless communication system adapted to perform asymmetric double-sided two-way ranging.

2. Description of the Related Art

In general, in the descriptions that follow, we will italicize the first occurrence of each special term of art which should be familiar to those skilled in the art of ultra-wideband ("UWB") communication systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive Boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

By way of example, in an ultra-wideband ("UWB") communication system, a series of special processing steps are performed by a UWB transmitter to prepare payload data for transmission via a packet-based UWB channel. Upon reception, a corresponding series of reversing steps are performed by a UWB receiver to recover the data payload. Details of both series of processing steps are fully described in IEEE Standards 802.15.4 ("802.15.4") and 802.15.4a ("802.15.4a"), which are expressly incorporated herein in their entirety by reference. As is known, these Standards describe required functions of both the transmit and receive portions of the system, but specify implementation details only of the transmit portion of the system, leaving to implementers the choice of how to implement the receive portion.

One or more of us have developed certain improvements for use in UWB communication systems, which improvements are fully described in the following pending applications or issued patents, all of which are expressly incorporated herein in their entirety:

"A Method and Apparatus for Transmitting and Receiving Convolutionally Coded Data", U.S. Pat. No. 7,636,397, issued 22 Dec. 2009;

"A Method and Apparatus for Generating Codewords", U.S. Pat. No. 7,787,544, issued 31 Jul. 2010;

"A Method and Apparatus for Transmitting and Receiving Convolutionally Coded Data", U.S. Pat. No. 8,358,709, issued 22 Jan. 2013; and "Receiver for Use in an Ultra-Wideband Communication System", U.S. Pat. No. 8,437,432, issued 7 May 2013;

"Convolution Code for Use in a Communication System", U.S. Pat. No. 8,677,224, issued 18 Mar. 2014;

"Adaptive Ternary A/D Converter for Use in an Ultra-Wideband Communication System", U.S. Pat. No. 8,436,758, issued 7 May 2013; and "Receiver for Use in an Ultra-Wideband Communication System", U.S. Pat. No. 8,760,334, issued 24 Jun. 2014.

In prior art wireless communication systems, one known approach for measuring the distance from device A to device B is to measure the round trip times for an electromagnetic signal such as a group of radio pulses to get the time of flight, $T_f$. We can then multiply this time, $T_f$, by the speed of radio waves (i.e., the speed of light) to find the distance from A to B.

For example, in FIG. 2, A transmits a packet, P1, to B. B receives this signal, and a short time later, $D_b$, it transmits a packet, P2, back to A. The packet, P2, arrives at A a time $R_a$ after transmitting packet P1. So we have the relationship:

$$R_a = 2T_f + D_b \qquad \text{[Eq. 1]}$$

So:

$$T_f = \frac{(R_a - D_b)}{2} \qquad \text{[Eq. 2]}$$

In practice, in A and B, the times are measured by real clocks, Clock A and Clock B, respectively. Because it may not be possible to synchronize these clocks with each other, they will run either faster or slower than an ideal clock, but if they are synchronized to a reference frequency generator, they will run at what can be assumed to be a constant frequency over the duration of the signal exchange. Let us say that Clock A and Clock B run respectively at $k_a$ and $k_b$ times the frequency of an ideal, true, clock. Any time measurements will be multiplied by these constants, $k_a$ or $k_b$. Let us denote the actual time estimates for $R_a$ as $\hat{R}_a$, for $D_a$ as $\hat{D}_a$ and similarly $\hat{R}_b$ and $\hat{D}_b$ are the estimates of $R_b$ and $D_b$. Since $\hat{R}_a$ is measured at A by A's clock:

$$\hat{R}_a = k_a R_a \qquad \text{[Eq. 3a]}$$

Similarly:

$$\hat{D}_a = k_a D_a \qquad \text{[Eq. 3b]}$$

$$\hat{R}_b = k_a R_b \qquad \text{[Eq. 3c]}$$

$$\hat{D}_b = k_a D_b \qquad \text{[Eq. 3d]}$$

We could use these estimates for $R_a$, etc., in Eq. 2 to develop an estimate, $\tilde{T}_f$, of $T_f$. However, if the values of $k_a$ or $k_b$ are unknown, then we cannot calculate $R_a$, etc. But, if we use $\hat{R}_a$, $\hat{D}_a$, etc., as estimates for $R_a$, $D_a$, etc.:

$$\hat{R}_a = 2\tilde{T}_f + \hat{D}_b \qquad \text{[Eq. 4a]}$$

$$\hat{R}_a = 2\tilde{T}_f + \hat{D}_b \qquad \text{[Eq. 4b]}$$

then we introduce a measurement error. For example, if we consider $\tilde{T}_{f1}$ to be an estimate of $T_f$:

$$\tilde{T}_{f1} = \frac{(\hat{R}_a - \hat{D}_b)}{2} = \frac{(k_a R_a - k_b D_b)}{2} \quad \text{[Eq. 5]}$$

then the error in this estimation is:

$$\tilde{T}_{f1} - T_f = \frac{((k_a - 1)R_a - (k_b - 1)D_b)}{2} \quad \text{[Eq. 6]}$$

For typical UWB systems, e.g., those based on the IEEE802.15.4a UWB physical layer, $(k_a-1)$ and $(k_b-1)$ are up to 20 ppm, i.e., $20\times10^{-6}$, and it is important to keep the error below 100 ps)($1\times10^{-10}$), which means the delays, e.g., $\hat{D}_b$, must be kept below about 5 μs. The delay includes the time to send the packet, which is typically >100 μs, so it is not practical to implement such short delays.

An improvement on this has been suggested by Fleming, et al. (U.S. Pat. No. 6,400,754), and later by Menzer, et al. (U.S. Pat. No. 7,843,379). In these schemes, a second round trip messaging round is implemented, for a total of 4 transmitted messages. The packet P2, sent from B not only acknowledges the arrival of P1 but its arrival at A initiates a delay, $\hat{D}_a$, in A before transmission of a third packet P3 by A. This third packet is received at B and the time for this second round trip is measured at B. In both of these schemes, it is suggested that the delay times $\hat{D}_a$ and $\hat{D}_b$ be made symmetric, i.e., be made to be equal or nearly equal. It is pointed out by Menzer that if this is done and if two estimates are calculated for each of the two round trips and if the two estimates are averaged, the errors almost cancel each other out and the overall error can be made to be acceptably small. Using this prior art method, the error in the average of the two estimates is:

$$\frac{(\tilde{T}_{f1} - T_f) + (\tilde{T}_{f2} - T_f)}{2} = \frac{((k_a - 1)R_a(k_b - 1)D_b)}{4} + \frac{((k_b - 1)R_b(k_a - 1)D_a)}{4} \quad \text{[Eq. 7a]}$$

$$\frac{(\tilde{T}_{f1} - T_f) + (\tilde{T}_{f2} - T_f)}{2} = \frac{((k_a - 1)R_a(k_b - 1)D_b)}{4} + \frac{((k_b - 1)R_b(k_a - 1)D_a)}{4} \quad \text{[Eq. 7b]}$$

While this is certainly true, we submit that it is an unreasonable burden on systems to require the response delays to always be symmetric, i.e., approximately equal.

We submit that what is needed is an improved method and apparatus for use in the receiver of a wireless communication system to determine ranging. In particular, we submit that such a method and apparatus should provide performance generally comparable to the best prior art techniques, but allow asymmetric delays to be used without significantly reducing accuracy.

BRIEF SUMMARY OF THE INVENTION

In accordance with a preferred embodiment of our invention, we provide an asymmetric double-sided two-way ranging method using three messages, $P_1$, $P_2$, and $P_3$, to complete a pair of round-trip delay measurements between a first device, A, having a first clock, $C_a$, and a second device, B, having a second clock, $C_b$. In accordance with our method, in A, we transmit $P_1$ at a selected point in time $T_0$ relative to $C_a$; then, in B, after an unknown time-of-flight, $T_f$, we receive $P_1$ at a time $T_1$ relative to $C_b$; and, after a first transmit delay, $\hat{D}_b$, we transmit $P_2$ at a time $T_2$ relative to $C_b$. Again in A, after a first response delay, $\hat{R}_a$, relative to $T_0$, we receive $P_2$ at a time $T_3$ relative to $C_a$; and after a second transmit delay, $\hat{D}_a$, we transmit $P_3$ at a time $T_4$ relative to $C_a$; and then, in B, after a second response delay, $\hat{R}_b$, relative to $T_2$, we receive $P_3$ at a time $T_5$ relative to $C_b$; and develop an estimate, $\tilde{T}_f$ of $T_f$ in accordance with a selected one of the following:

$$\tilde{T}_{fa} = \frac{1}{2} \frac{\hat{R}_a \hat{R}_b - \hat{D}_a \hat{D}_b}{\hat{R}_a + \hat{D}_a};$$

$$\tilde{T}_{fb} = \frac{1}{2} \frac{\hat{R}_a \hat{R}_b - \hat{D}_a \hat{D}_b}{\hat{R}_b + \hat{D}_b}; \text{ and}$$

$$\tilde{T}_{fab} = \frac{\hat{R}_a \hat{R}_b - \hat{D}_a \hat{D}_b}{\hat{R}_a + \hat{D}_a + \hat{R}_b + \hat{D}_b}.$$

In accordance with a further embodiment of our invention, we enhance our method by developing, in B, an estimate of a distance between A and B as a function of $\tilde{T}_f$.

The methods of our invention may be embodied in computer readable code on a suitable computer readable medium such that when a processor executes the computer readable code, the processor executes the respective method.

BRIEF DESCRIPTION OF THE SEVERAL VIEWS OF THE DRAWINGS

Our invention may be more fully understood by a description of certain preferred embodiments in conjunction with the attached drawings in which.

Figure 1:
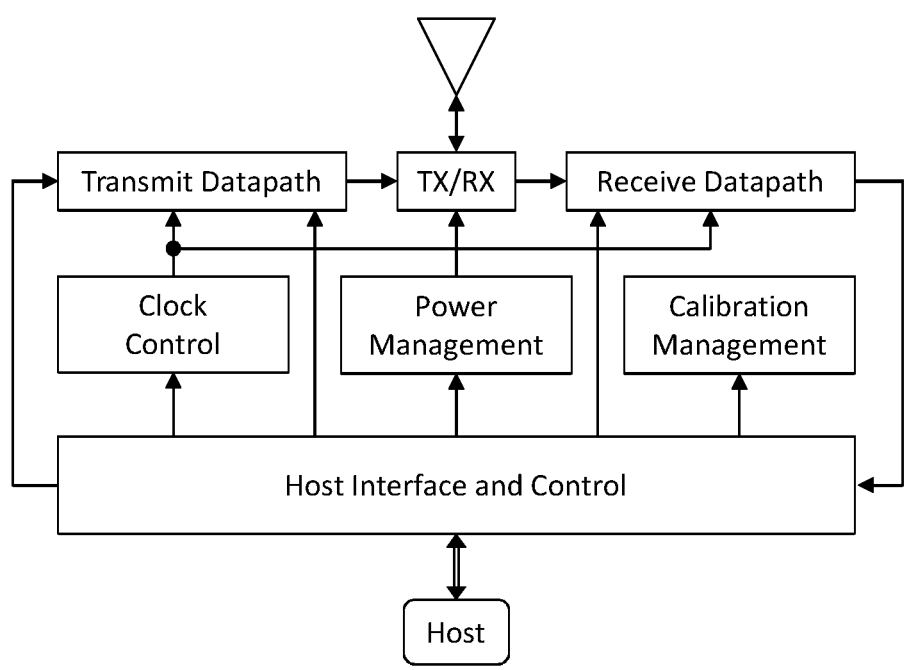
FIG. 1 illustrates, in block diagram form, one embodiment of a receiver adapted for use in a UWB communication system.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Recall that we do not know the real delay times, $D_a$ and $D_b$, or the round trip times, $R_a$ and $R_b$. All we have are estimates which we know are in error by a much larger amount than the time of flight we are trying to estimate. Indeed, the amount of error in these estimates is impossible to know without access to a perfect clock.

We know from Eq. 4:

$$D_a = \frac{\hat{D}_a}{k_a} \quad \text{[Eq. 8a]}$$

And similarly:

$$D_b = \frac{\hat{D}_b}{k_b} \quad \text{[Eq. 8b]}$$

Then from Eq. 8a and Eq. 1:

$$R_a = 2T_f + \frac{\hat{D}_b}{k_b} \quad \text{[Eq. 9a]}$$

And similarly:

$$D_b = \frac{\hat{D}_b}{k_b} \quad \text{[Eq. 9b]}$$

Then from Eq. 9a and Eq. 3a:

$$\hat{R}_a = 2k_a T_f + \frac{k_a \hat{D}_b}{k_b} \quad \text{[Eq. 10a]}$$

Similarly, from Eq. 9b and Eq. 3b:

$$\hat{R}_b = 2k_b T_f + \frac{k_b \hat{D}_a}{k_a} \quad \text{[Eq. 10b]}$$

In Eq. 10a and Eq. 10b, above, we have elapsed time periods, $\hat{R}_a$, $\hat{R}_b$, $\hat{D}_a$ and $\hat{D}_b$, that we can measure using the respective, local clocks of A and B. But we have no convenient way of measuring $k_a$ or $k_b$; and these clock skew errors swamp the value of $T_f$. We have discovered, however, that if we multiply $\hat{R}_a$ by $\hat{R}_b$, the bulk of the value of the product will be the product of $\hat{D}_a$ and $\hat{D}_b$. Thus, for this term in the product, the $k_a$ and $k_b$ constants effectively cancel each other out. Let us see where this leads:

From Eq. 10a and Eq. 10b:

$$\hat{R}_a \hat{R}_b = 4k_a k_b T_f^2 + \frac{k_a \hat{D}_b}{k_b}\frac{k_b \hat{D}_a}{k_a} + 2k_b T_f \frac{k_a \hat{D}_b}{k_b} + 2k_a T_f \frac{k_b \hat{D}_a}{k_a} \quad \text{[Eq. 11]}$$

$$\hat{R}_a \hat{R}_b = 4k_a k_b T_f^2 + \hat{D}_a \hat{D}_b + 2T_f(k_a \hat{D}_b + k_b \hat{D}_a) \quad \text{[Eq. 12]}$$

$$\hat{R}_a \hat{R}_b - \hat{D}_a \hat{D}_b = 4k_a k_b T_f^2 + 2T_f(k_a \hat{D}_b + k_b \hat{D}_a) \quad \text{[Eq. 13]}$$

Then from Eq. 10a and Eq. 13:

$$\frac{\hat{R}_a \hat{R}_b - \hat{D}_a \hat{D}_b}{\hat{R}_a + \hat{D}_a} = \frac{4k_a k_b T_f^2 + 2T_f(k_a \hat{D}_b + k_b \hat{D}_a)}{2k_a T_f + \frac{k_a \hat{D}_b}{k_b} + \hat{D}_a} \quad \text{[Eq. 14]}$$

On the left hand side, taking out $2T_f$ and multiplying above and below by $k_b$:

$$\frac{\hat{R}_a \hat{R}_b - \hat{D}_a \hat{D}_b}{\hat{R}_a + \hat{D}_a} = 2T_f k_b \frac{2k_a k_b T_f + k_a \hat{D}_b + k_b \hat{D}_a}{2k_a k_b T_f + k_a \hat{D}_b + k_b \hat{D}_a} \quad \text{[Eq. 15]}$$

So finally:

$$\frac{\hat{R}_a \hat{R}_b - \hat{D}_a \hat{D}_b}{\hat{R}_a + \hat{D}_a} = 2T_f k_b \approx 2T_f \quad \text{[Eq. 16a]}$$

Similarly:

$$\frac{\hat{R}_a \hat{R}_b - \hat{D}_a \hat{D}_b}{\hat{R}_b + \hat{D}_b} = 2T_f k_a \approx 2T_f \quad \text{[Eq. 16b]}$$

So now we have two possible estimates for $T_f$. Since $k_a$ and $k_b$ are very close to 1, i.e., $0.99998 < k_a, k_b < 1.00002$, we can estimate $T_f$ as follows:

$$\tilde{T}_{fa} = \frac{1}{2}\frac{\hat{R}_a \hat{R}_b - \hat{D}_a \hat{D}_b}{\hat{R}_a + \hat{D}_a} \quad \text{[Eq. 17a]}$$

$$\tilde{T}_{fb} = \frac{1}{2}\frac{\hat{R}_a \hat{R}_b - \hat{D}_a \hat{D}_b}{\hat{R}_b + \hat{D}_b} \quad \text{[Eq. 17b]}$$

Note that these estimates are very close to the actual $T_f$ because $k_a$ and $k_b$ are very close to one, and, in particular, their accuracy is independent of the delays employed at A and at B.

Whether a system should best use Eq. 17a or Eq. 17b would depend on which clock it expects to be more accurate. For example, if the system consisted of devices with high accuracy clocks in Role B, above, and tags with low accuracy clocks in Role A, above, then it should use Eq. 17a. If it expects neither to be more accurate than the other and it cannot readily calculate the accuracy of either, it would be most accurate to use the average result from Eq. 17a and Eq. 17b since this will always be as good as, or better than, the worst of the two. We have found by experimentation with typical values of delay and clock offset that this average can be approximated by the following:

$$\tilde{T}_{fab} = \frac{\hat{R}_a \hat{R}_b - \hat{D}_a \hat{D}_b}{\hat{R}_a + \hat{D}_a + \hat{R}_b + \hat{D}_b} \quad \text{[Eq. 18]}$$

Note that the value of $\hat{R}_a$ is close to the value of $\hat{D}_b$, since $\hat{D}_b$ makes up most of the time for this particular round trip measurement. This means that in the denominator of formulas Eq. 17a, Eq. 17b and Eq. 18, $\hat{D}_b$ can be used instead of $\hat{R}_a$ or $\hat{R}_a$ can be used instead of $\hat{D}_b$ without greatly reducing the accuracy. Similarly, $\hat{D}_a$ can be used instead of $\hat{R}_b$ and $\hat{R}_b$ can be used instead of $\hat{D}_a$, leading, e.g., to:

$$\hat{T}_{fD} = \frac{1}{2} \frac{\hat{R}_a \hat{R}_b - \hat{D}_a \hat{D}_b}{\hat{D}_a + \hat{D}_b} \quad \text{[Eq. 19]}$$

Systems which Benefit from Flexible Response Delays

By way of example, let us assume that one device device sends a packet, P1, to many, say 5, tags. Each tag then responds with a packet to this device in successive responses: Tag 1 responds with packet 2a after time t; Tag 2 responds with packet 2b after time 2t; Tag 3 responds with packet 2c after time 3t; Tag 4 responds after time with packet 2d 4t; and Tag 5 responds with packet 2e after time St. Now, the device closes off the round with a final packet 3. Each tag can now calculate its distance from the device after a sequence of just 7 messages. If the device had used SDS-TWR, it would be forced to have the same delay for each tag interaction and a minimum of 3 messages per tag, or 15 messages would be required. In accordance with our invention, the number of packets required is N+2 instead of 3N. By thus allowing asymmetric delays, our invention results in a significant reduction in airtime and power consumption.

Consider now a system with a mobile tag (on an asset, say) that sends a packet P1 received by many fixed devices in an infrastructure, where three of which reply in turn with packets P2a, P2b, P2c, after which the tag sends P3 received by all three devices. Then, using our invention, each of the three devices independently calculates its distance to the tag. These three distances can then be combined in an infrastructure-based-solver to locate the tag by triangulation. This allows the tag/asset to be located after sending 2 messages and receiving 3. If symmetric timings were needed, as in the prior art, then this process would require a minimum of 6 transmissions and 3 receptions to complete.

Figure 2:
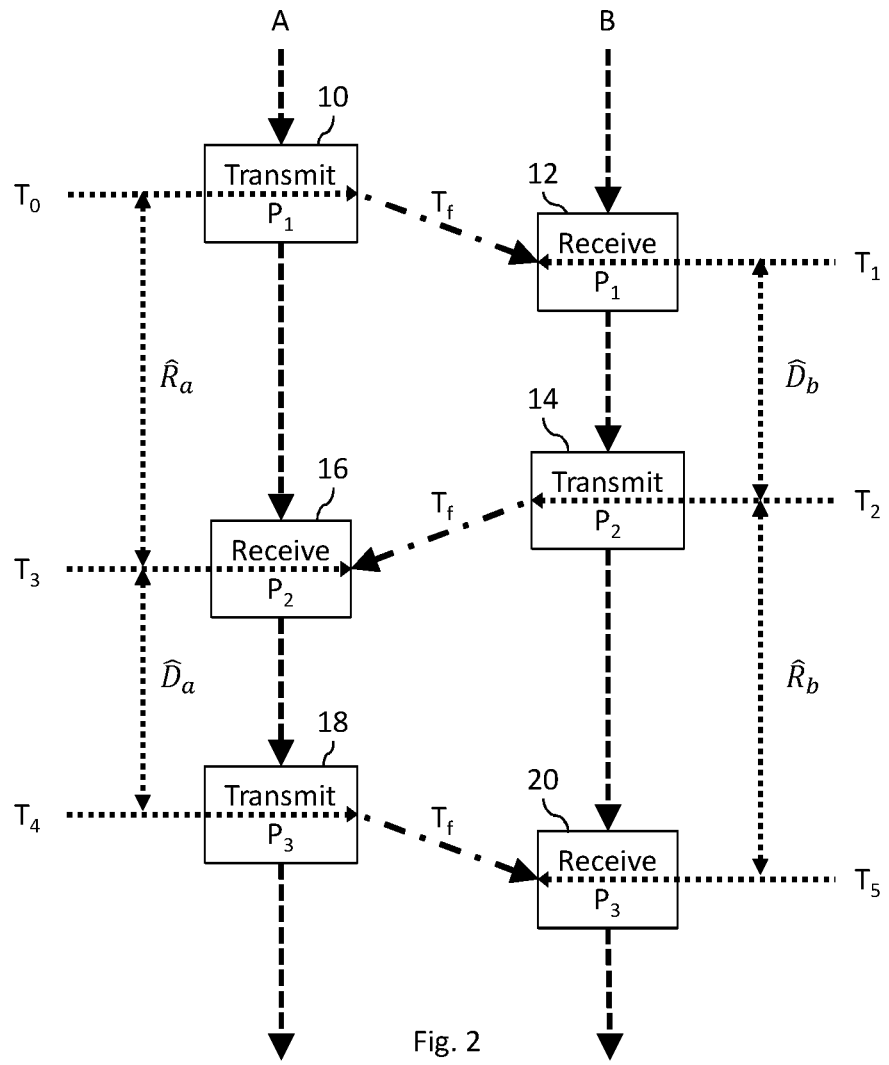
FIG. 2 illustrates, in time flow form, one embodiment of a method adapted to determine ranging in accordance with our invention.

In the case of a peer-to-peer network of N mobile nodes where each node wants to find its distance to every other peer node as part of solving their relative location, then this is ½N(N−1) distance measurements. For example, for a 5 node system, this consists of 10 distinct distance measurements. With the prior art symmetric double-sided ranging, this requires 3 messages per distance measurement. In some cases, there may also be a need to send an additional message to communicate the results, which could be 1 per distance measurement or just 1 per node containing all the results which that node calculated. This is then a total of 35 to 40 messages in the 5 node example case. Using our asymmetric ranging invention, as illustrated in FIG. 2, the ranging exchanges can be combined and completed with just two transmissions per node, i.e., 10 messages in the case of the 5 node example. This is achieved as follows:

Let us define the three messages of the ranging exchange as: the Poll, P, sent by the initiator; the Response, R; and the Final message, F, that completes the two round trips; and, further, define the result communicated as a time-of-flight report message, T. If we enumerate these messages as P, R, F and T, with subscripts indicating the source and destination node addresses, and number the nodes from 1 to 5, then the 10 ranging exchanges for the 5 nodes can be achieved with the 10 messages listed in table 1:

TABLE 1

Example 5 node peer-to-peer optimized ranging solution

| Message # | Sender Node | Message Content | Description |
|---|---|---|---|
| 1 | 1 | $P_{12} P_{13} P_{14} P_{15}$ | Initiating Poll from node 1 to the others. |
| 2 | 2 | $R_{21} P_{23} P_{24} P_{25}$ | This message is the Response to node 1, and, also serves as node 2's initiating Poll to nodes 3, 4 and 5. |
| 3 | 3 | $R_{31} R_{32} P_{34} P_{35}$ | Responses to nodes 1 and 2, and also serves an Initiating Poll to nodes 2 and up. |
| 4 | 4 | $R_{41} R_{42} R_{43} P_{45}$ | Node 4's Responses to nodes 0, 1 and 2, and Poll to node 5. |
| 5 | 5 | $R_{51} R_{52} R_{53} R_{54}$ | Gives Response to nodes 0, 1, 2 and 3. |
| 6 | 1 | $F_{12} F_{13} F_{14} F_{15}$ | Final Messages completing the ranging exchange between node 1 and each of the other nodes 2 to 5. |
| 7 | 2 | $T_{21} F_{23} F_{24} F_{25}$ | TOF message reporting the node-1 to node-2 distance. And the Final Messages completing the ranging exchanges between node 2 and each of the other nodes 3 to 5. |
| 8 | 3 | $T_{31} T_{32} F_{34} F_{35}$ | TOF messages reporting node 3's distances to nodes 1 and 2. And the Final Messages completing the ranging exchanges between node 3 and each of the other nodes 4 and 5. |
| 9 | 4 | $T_{41} T_{42} T_{43} F_{45}$ | TOF messages reporting node 4's distances to nodes 1, 2 and 3. And the Final Message completing the ranging exchange between node 4 and node 5. |
| 10 | 5 | $T_{51} T_{52} T_{53} T_{54}$ | TOF messages reporting node 5's distances to nodes 1, 2, 3 and 4. |

As can be seen, this then is a substantial saving on message traffic (saving battery power and air-time). However, the ranging exchanges are highly asymmetric: in the Table 1 example, above, the ranging exchange between node 1 and node 5 starts with the poll from node 1 at message #1, then the response from node 5 is at message #5 and the final from node 1 is message #6. If these message times are in units approximately 200 μs, then these two round trips are asymmetric with timings of approximately 800 μs versus 200 μs. This scheme then only works well when the asymmetric nature of the communications does not lead to a large ranging error. Fortunately, however, there are many other examples where flexible response delays are an advantage.

Possible Ranging Schemes

As noted above, FIG. 2 illustrates a two-way ranging exchange using three messages to complete a pair of round-trip delay measurements. In this scheme, a first device, A, transmits a first message, $P_1$, at a selected point in time (step 10). After an unknown time-of-flight, $T_f$, a second device, B, receives $P_1$ (step 12). After a first delay, $\hat{D}_b$, that is characteristic of B, B transmits a second message, $P_2$ (step 14). After $T_f$, A receives $P_2$ (step 16). After a second delay, $\hat{D}_a$, that is characteristic of A, A transmits a third message, $P_3$ (step 18). Finally, after $T_f$, B receives $P_3$ (step 20). Using a selected one of either Eq. 17a and Eq. 17b, or, perhaps, using only Eq. 18, we can now calculate a reasonably close estimate of $T_f$.

Figure 3:
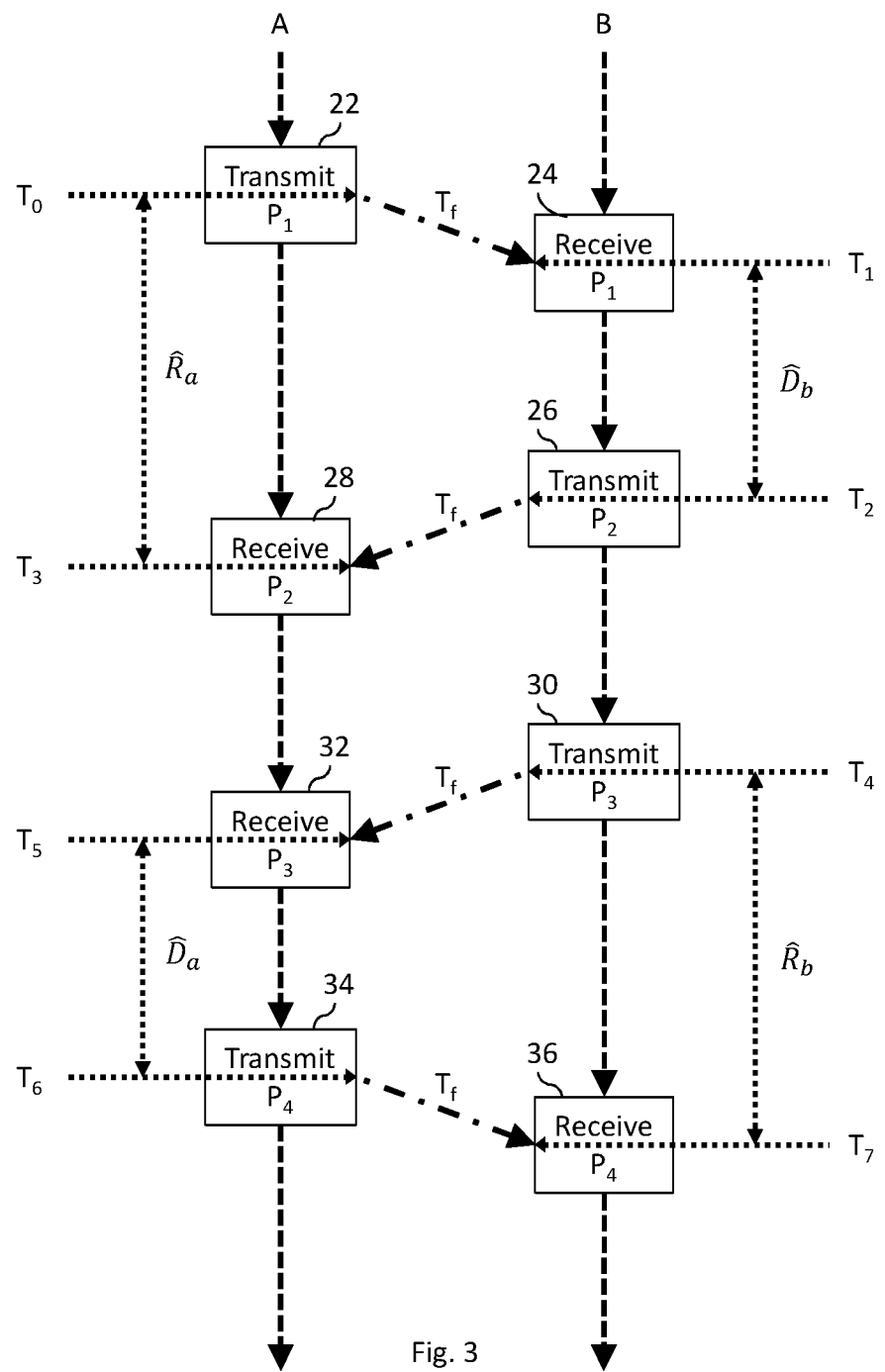
FIG. 3 illustrates, in time flow form, one other embodiment of a method adapted to determine ranging in accordance with our invention.

As shown in FIG. 3, our asymmetric ranging method can also be performed using four messages to comprise two pairs of round-trip measurements, where each pair is separated in time by some relatively small but otherwise arbitrary interval. In accordance with this alternative scheme, the first round-trip measurement consists of a first message, $P_1$ (steps 22 and 24) and a first response, $P_2$ (steps 26 and 28), and the later, second round-trip measurement also consists of a second message, $P_3$ (steps 30 and 32) and a second response, $P_4$ (steps 34 and 36), but sent in the opposite direction to those of the first round-trip measurement. Again, using a selected one of either Eq. 17a and Eq. 17b, or, perhaps, using only Eq. 18, we can now calculate a reasonably close estimate of $T_f$.

Thus it is apparent that we have provided an improved method and apparatus for use in the receiver of a wireless communication system to determine ranging. Although we have so far disclosed our invention only in the context of a packet-based UWB communication system, we appreciate that our invention is broadly applicable to other types of wireless communication systems, whether packed-based or otherwise, that perform ranging using response time stamps. Further, we submit that our invention provides performance generally comparable to the best prior art techniques but more efficiently than known implementations of such prior art techniques.

What we claim is:

1. An asymmetric double-sided two-way ranging method using three messages, $P_1$, $P_2$, and $P_3$, to complete a pair of round-trip delay measurements between a first device, A, having a first clock, $C_a$, and a second device, B, having a second clock, $C_b$, the method comprising the steps of:
   [1.1] in A, transmitting $P_1$ at a selected point in time $T_0$ relative to $C_a$;
   [1.2] in B:
      [1.2.1] after an unknown time-of-flight, $T_f$, receiving $P_1$ at a time $T_1$ relative to $C_b$; and
      [1.2.2] after a first transmit delay, $\hat{D}_b$, transmitting $P_2$ at a time $T_2$ relative to $C_b$;
   [1.3] in A:
      [1.3.1] after a first response delay, $\hat{R}_a$, relative to $T_0$, receiving $P_2$ at a time $T_3$ relative to $C_a$; and
      [1.3.2] after a second transmit delay, $\hat{D}_a$, transmitting $P_3$ at a time $T_4$ relative to $C_a$; and
   [1.4] in B:
      [1.4.1] after a second response delay, $\hat{R}_b$, relative to $T_2$, receiving $P_3$ at a time $T_5$ relative to $C_b$; and
      [1.4.2] developing an estimate, $\hat{T}_f$, of $T_f$ in accordance with a selected one of:

$$[1.4.2.1] \quad \hat{T}_{fa} = \frac{1}{2} \frac{\hat{R}_a \hat{R}_b - \hat{D}_a \hat{D}_b}{\hat{R}_a + \hat{D}_a};$$

$$[1.4.2.2] \quad \hat{T}_{fb} = \frac{1}{2} \frac{\hat{R}_a \hat{R}_b - \hat{D}_a \hat{D}_b}{\hat{R}_b + \hat{D}_b}; \text{ and}$$

$$[1.4.2.3] \quad \hat{T}_{fab} = \frac{\hat{R}_a \hat{R}_b - \hat{D}_a \hat{D}_b}{\hat{R}_a + \hat{D}_a + \hat{R}_b + \hat{D}_b}.$$

2. The method of claim 1 further including the step of:
   [1.4.3] developing an estimate of a distance between A and B as a function of $\hat{T}_f$.

3. An asymmetric double-sided two-way ranging method using four messages, $P_1$, $P_2$, $P_3$ and $P_4$, to complete a pair of round-trip delay measurements between a first device, A, having a first clock, $C_a$, and a second device, B, having a second clock, $C_b$, the method comprising the steps of:
   [3.1] in A, transmitting $P_1$ at a selected point in time $T_0$ relative to $C_a$;
   [3.2] in B:
      [3.2.1] after an unknown time-of-flight, $T_f$, receiving $P_1$ at a time $T_1$ relative to $C_b$; and
      [3.2.2] after a first transmit delay, $\hat{D}_b$, transmitting $P_2$ at a time $T_2$ relative to $C_b$;
   [3.3] in A:
      [3.3.1] after a first response delay, $\hat{R}_a$, relative to $T_0$, receiving $P_2$ at a time $T_3$ relative to $C_a$;
   [3.4] in B, transmitting $P_3$ at a selected point in time $T_4$ relative to $C_b$;
   [3.5] in A:
      [3.5.1] after an unknown time-of-flight, $T_f$, receiving $P_3$ at a time $T_5$ relative to $C_a$; and
      [3.5.2] after a second transmit delay, $\hat{D}_a$, transmitting $P_4$ at a time $T_6$ relative to $C_a$; and
   [3.6] in B:
      [3.6.1] after a second response delay, $\hat{R}_b$, relative to $T_4$, receiving $P_4$ at a time $T_7$ relative to $C_b$; and
      [3.6.2] developing an estimate, $\hat{T}_f$, of $T_f$ in accordance with a selected one of:

$$[3.6.2.1] \quad \hat{T}_{fa} = \frac{1}{2} \frac{\hat{R}_a \hat{R}_b - \hat{D}_a \hat{D}_b}{\hat{R}_a + \hat{D}_a};$$

$$[3.6.2.2] \quad \hat{T}_{fb} = \frac{1}{2} \frac{\hat{R}_a \hat{R}_b - \hat{D}_a \hat{D}_b}{\hat{R}_b + \hat{D}_b}; \text{ and}$$

$$[3.6.2.3] \quad \hat{T}_{fab} = \frac{\hat{R}_a \hat{R}_b - \hat{D}_a \hat{D}_b}{\hat{R}_a + \hat{D}_a + \hat{R}_b + \hat{D}_b}.$$

4. The method of claim 3 further including the step of:
   [3.6.3] developing an estimate of a distance between A and B as a function of $\hat{T}_f$.

5. An asymmetric two-way ranging circuit configured to perform the method of any preceding claim.

6. A wireless receiver comprising an asymmetric two-way ranging circuit according to claim 5.

7. A wireless transceiver comprising a wireless receiver according to claim 6.

8. A wireless communication system comprising a wireless transceiver according to claim 7.

9. A non-transitory computer readable medium including executable instructions which, when executed in a processing system, causes the processing system to perform the steps of a method according to any one of claims 1 to 4.

* * * * *